United States Patent
Mizukami

(10) Patent No.: US 7,797,458 B2
(45) Date of Patent: Sep. 14, 2010

(54) DATA SYNCHRONOUS SYSTEM FOR SYNCHRONIZING UPDATED DATA IN A REDUNDANT SYSTEM

(75) Inventor: Takashi Mizukami, Chiba (JP)

(73) Assignee: Oki Electric Industry Co., Ltd., Tokyo (JP)

(*) Notice: Subject to any disclaimer, the term of this patent is extended or adjusted under 35 U.S.C. 154(b) by 38 days.

(21) Appl. No.: 12/232,342

(22) Filed: Sep. 16, 2008

(65) Prior Publication Data

US 2009/0083393 A1 Mar. 26, 2009

(30) Foreign Application Priority Data

Sep. 25, 2007 (JP) ............................. 2007-247855

(51) Int. Cl.
G06F 15/16 (2006.01)
(52) U.S. Cl. ..................... 709/248; 709/214; 714/4; 711/100
(58) Field of Classification Search .............. 709/214, 709/248; 714/4; 711/100
See application file for complete search history.

(56) References Cited

U.S. PATENT DOCUMENTS

| 6,601,134 B1* | 7/2003 | Yamagami et al. | 711/111 |
| 2005/0229022 A1* | 10/2005 | Koishi | 714/4 |
| 2006/0224918 A1 | 10/2006 | Koike | |
| 2007/0130442 A1* | 6/2007 | Lee et al. | 711/207 |

FOREIGN PATENT DOCUMENTS

| JP | 2002-373084 A | 12/2002 |
| JP | 2004-157795 A | 6/2004 |

* cited by examiner

Primary Examiner—Salad Abdullahi
Assistant Examiner—El Hadji M Sall
(74) Attorney, Agent, or Firm—Rabin & Berdo, P.C.

(57) ABSTRACT

A data synchronous system synchronizes, between servers each having a shared memory, data which are stored on the respective shared memories. The system includes a data writer which writes data into the shared memory in one of the servers and then generates write state information on the write state of data written in the shared memory; and a data communicator which reads out the written data and positional information about a position on the shared memory of the written data on the basis of the write state information, and transfers the read data and positional information from the one server to another or some other servers.

9 Claims, 12 Drawing Sheets

FIG. 6

| ITEMS | DESCRIPTION |
|---|---|
| 31 — SEGMENT IDENTIFIER | ITEM OF UNIQUELY IDENTIFYING SHARED MEMORY SEGMENT |
| 32 — SEGMENT INDEX | SEGMENT NUMBER COUNTING FROM THE TOP OF SEGMENTS OF SHARED MEMORY |

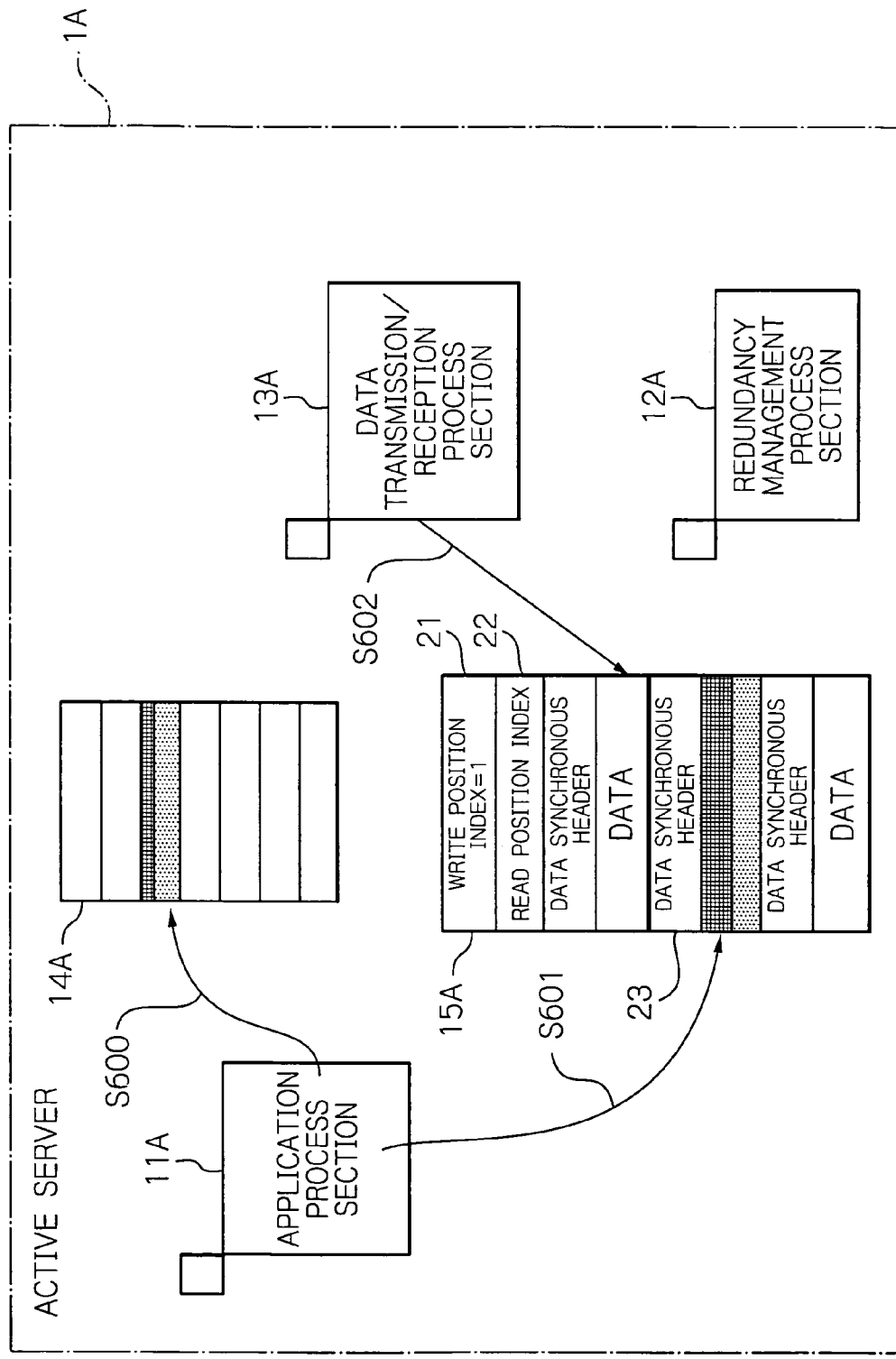

DATA SYNCHRONOUS SYSTEM FOR SYNCHRONIZING UPDATED DATA IN A REDUNDANT SYSTEM

BACKGROUND OF THE INVENTION

1. Field of the Invention

The present invention relates to a data synchronous system applicable to, e.g. a redundant system having an active and a standby server, and a method of synchronizing data in such a data synchronous system.

2. Description of the Background Art

A system that is required to have high reliability, such as a call server providing an IP (Internet Protocol) telephone service, is generally configured to have an active and a standby server as shown in FIG. 2. The active and standby servers are connected via an IP network 511, which allows IP communicating terminals 512 to connect. The active and standby servers have a respective, redundancy management function of mutually confirming the existence of a mating server, as depicted with a box 513 in FIG. 2. That function is implemented by, e.g. redundancy management process sections 51A and 51B. When the active server 5A cannot provide services any longer due to a failure or a software bug, the sections 51A and 51B switch the standby server 5B to its active state. As such, if one server fails, the other server can continue to provide services.

Recently, as disclosed by U.S. patent application publication No. US 2006/0224918 A1 to Koike, memory synchronization can be performed between the active and standby servers to transfer call information from a system zero to a system one in such a manner that, while a call is established, information on that call is transferred from the system zero acting in its active state to the system one standing by, thus allowing the call having originated on the system zero to be switched to the system one without being disconnected.

As seen from FIG. 3, in the Koike system, an application process section 52A of the active server 5A changes data, and stores the changed data 521 in a shared memory segment array 53A and inputs to a synchronous request queue 54A the positional information 522, such as storage location address and size, of the changed data 521. Then, a data transmission/reception process section 55A reads out the positional information 551 from the synchronous request queue 54A, and reads out the data 552 stored in the shared memory segment array 53A on the basis of the positional information 551 to transfer the read data 553 to the standby server 5B. In the standby server 5B, the data transmission/reception process section 55B reflects the readout data 553 on a shared memory segment array 53B as reflecting data 554.

In the application process of a call server, when providing a telephone service, it is generally necessary to respond immediately. In the above-mentioned Koike system, the data can be transferred from the active server to the standby server by a separate process from the application process, thereby avoiding delays otherwise caused in the application process.

In the Koike system, however, the application process and the data transmission/reception process run in parallel with each other. In FIG. 4, while the application process section 52A is executing update 523 of a data segment 6 in the shared memory segment array 53B, the data segment 6 may include updated data 61 and not updated data 62. Consequently, as shown in FIG. 4, the data transmission/reception process section 55A may perform the readout 555 of the data segment 6 still being changed by the application process section 52A.

Thus, the conventional system has a problem that because the application process and the data transmission/reception process run in parallel with each other, when access to the shared memory segment array is not restricted e.g. by semaphore, there is a possibility that data being changed will be transmitted to the standby system. In such a case, as shown in FIG. 5, the data segment 6 will be transferred to the data transmission/reception process section 55B in the standby server 5B as the data changed halfway 556 so that the data 556 is reflected on the shared memory segment array 53B as reflecting data 557. In the state shown in FIG. 5, if the active server 5A fails, then the application process section 52B of the standby server 5B may provide services with the data changed halfway 556.

When a plurality of processes read out one and the same data in a shared memory, a POSIX (Portable Operating System Interface) semaphore implemented by a UNIX (trademark) computer operating system, such as LINUX (trademark), is generally available. However, the use of the POSIX semaphore is not preferable because, when the transmission/reception process is operating for data synchronization, the application process will be stopped in operation.

SUMMARY OF THE INVENTION

It is an object of the present invention to provide a data synchronous system which comprises a plurality of servers each having a shared memory and synchronizes data stored on the respective shared memories between the servers and is capable of synchronizing data written on the shared memory of one server with another or one of other servers without stopping the operation of an application process. It is also an object of the present invention to provide a method of and a program for synchronizing data in such a data synchronous system, and the server comprised in the data synchronous system.

In accordance with the present invention, there is provided a data synchronous system for synchronizing, between a plurality of servers each having a shared memory, data which are stored on the respective shared memories. The system includes a data writer which writes data into the shared memory in one of the plurality of servers and then generates write state information on the write state of data written in the shared memory; and a data communicator which is operative in response to the write state information to read out the written data and positional information about a position on the shared memory of the written data, and transfer the read-out data and positional information from the one server to another of the plurality of servers.

Also in accordance with the present invention, there is provided a method of synchronizing, between a plurality of servers each having a shared memory, data which are stored on the respective shared memories, wherein each server includes a data writer and a data communicator. The method comprises a data writing step causing said data writer to write data into the shared memory in one of the plurality of servers and then generate write state information on the write state of data written in the shared memory; and a data transmission step of causing the data communicator to read out the written data and positional information about a position on the shared memory of the written data on the basis of the write state information, and transfer the read-out data and positional information from one server to another of the plurality of servers.

Further, in accordance with the present invention, there is provided a data synchronization program for causing a computer to synchronize, between a plurality of servers each having a shared memory, data which are stored on the respective shared memories. Each of the plurality of servers is caused to function as: a data writer for writing data into the shared memory in one of the plurality of servers and then generating write state information on the write state of data written in the shared memory; and a data communicator operative in response to the write state information for reading out the written data and positional information about a position on the shared memory of the written data, and transferring the read-out data and positional information from the one server to another of the plurality of servers.

Moreover, in accordance with the present invention, there is provided a server, which constitutes a redundant system together with another server, and comprises the data synchronous system as defined in the present invention.

According to the present invention, in the data synchronous system, which comprises a plurality of servers each having a shared memory and synchronizes data stored on the respective shared memories between the servers, it is capable of synchronizing data written on the shared memory of one server with another server without stopping the operation of an application process.

BRIEF DESCRIPTION OF THE DRAWINGS

The objects and features of the present invention will become more apparent from consideration of the following detailed description taken in conjunction with the accompanying drawings in which:

FIG. 6 shows a plurality of items of information contained in the synchronous header of data handled in the illustrative embodiment shown in FIG. 1;

FIG. 12 is a schematic block diagram showing how the reading of data by the data transmission/reception process is performed when the application process is writing changed data in the active server of the illustrative embodiment.

DESCRIPTION OF THE PREFERRED EMBODIMENT

An illustrative embodiment of the data synchronous system for synchronizing data in accordance with the present invention will hereinafter be described with reference to the accompanying drawings. In the illustrative embodiment, the data synchronous system of the present invention is applied to a redundant system with an active and a standby server that are connected to an IP (Internet Protocol) network.

The active and standby servers may have the same configuration as a general server to include a central processing unit (CPU), a memory, an external storage device, a communicator, and so forth. The active and standby servers implement various processes by software as described below.

Figure 1:
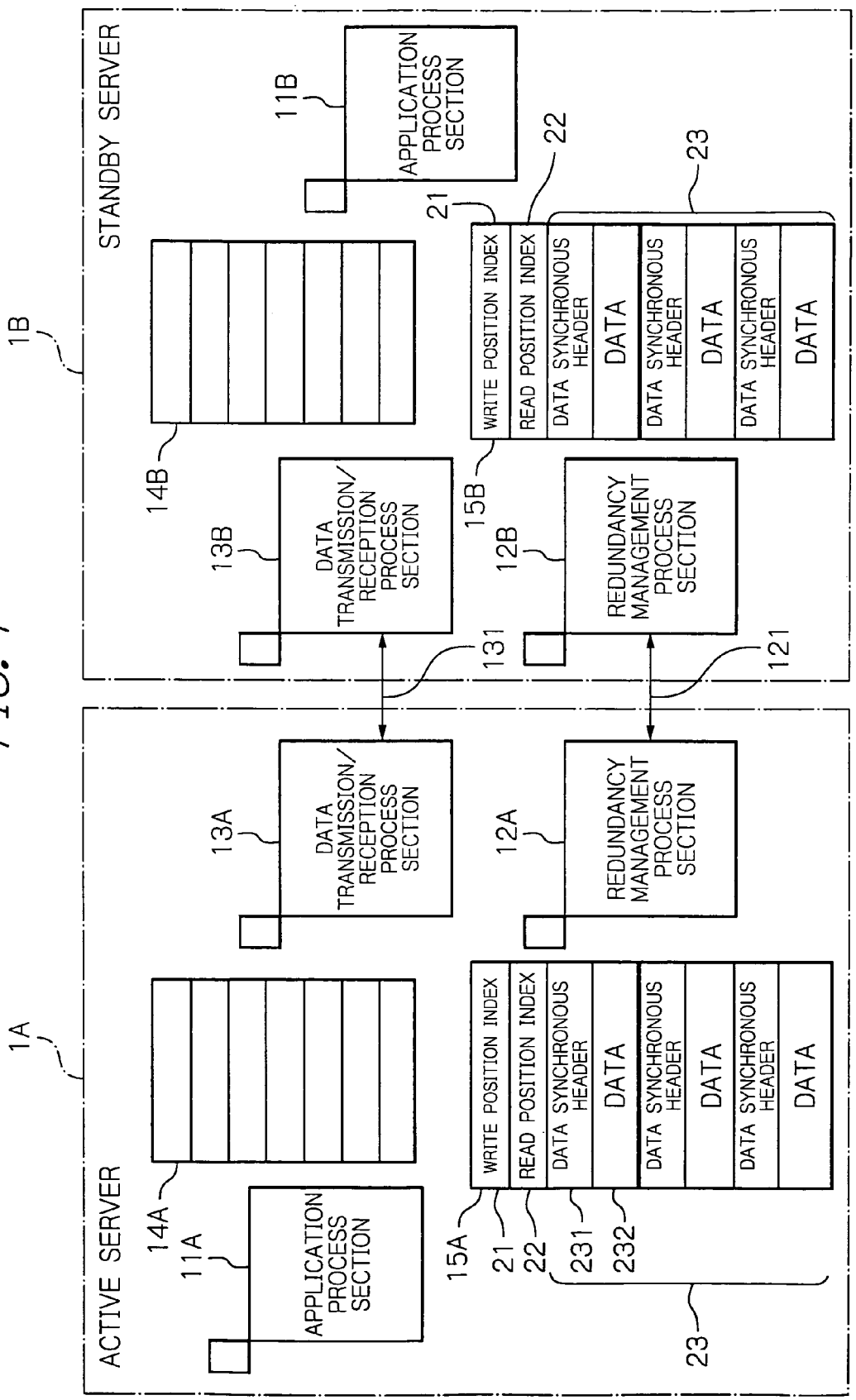
FIG. 1 is a schematic block diagram showing an illustrative embodiment of a duplex system having an active and a standby server in accordance with the present invention.
Figure 2:
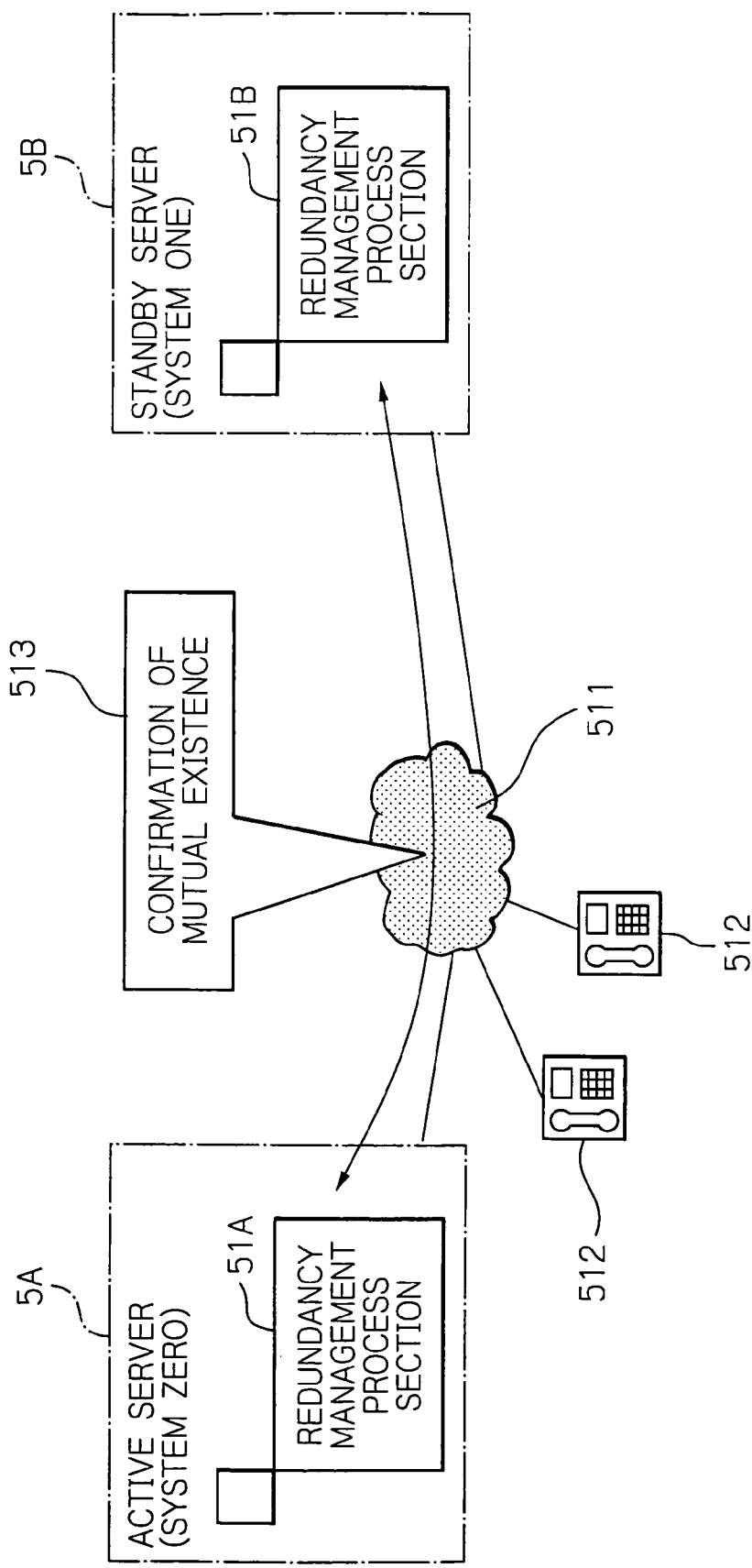
FIG. 2 is a schematic block diagram showing a conventional duplex system with an active and a standby server.
Figure 3:
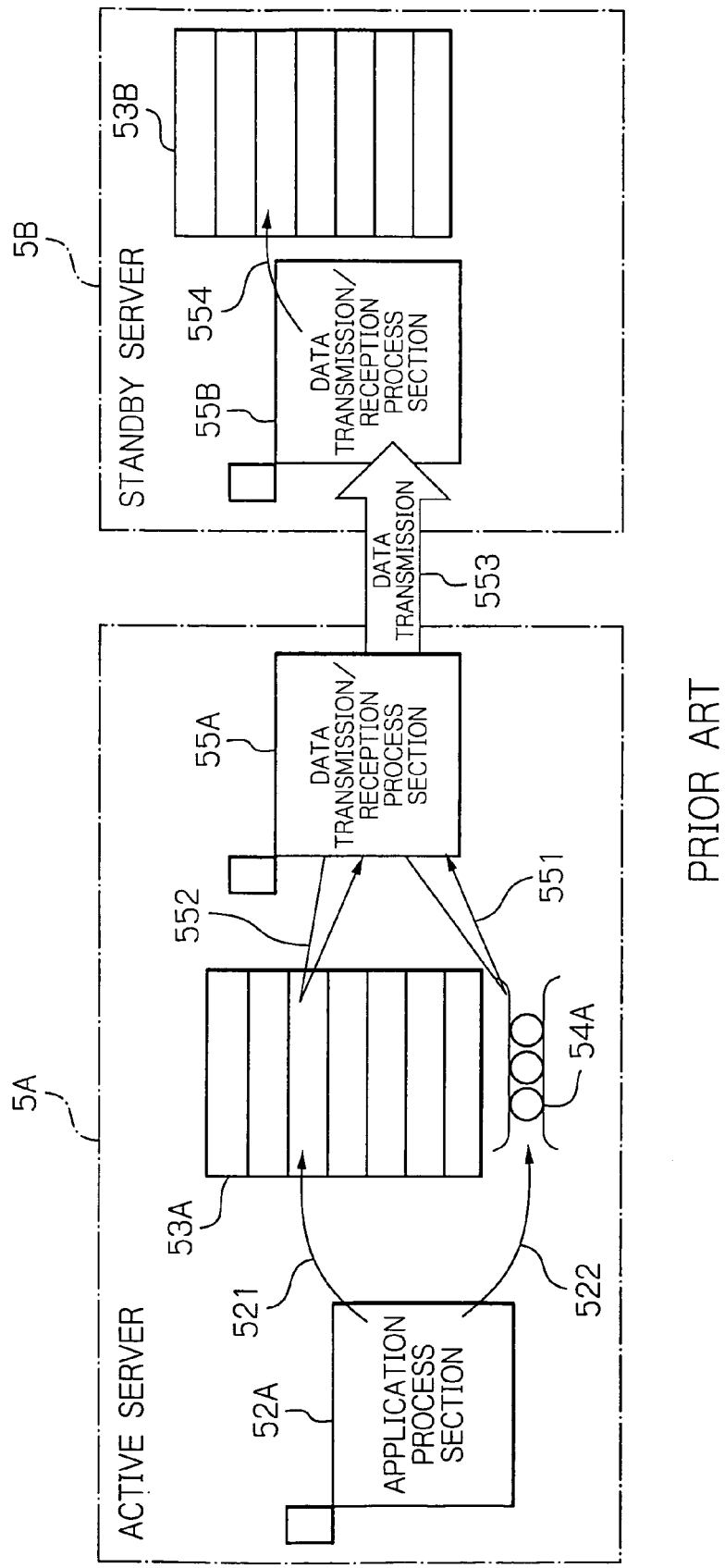
FIG. 3 is a schematic block diagram showing how the conventional data synchronization process is performed.
Figure 4:
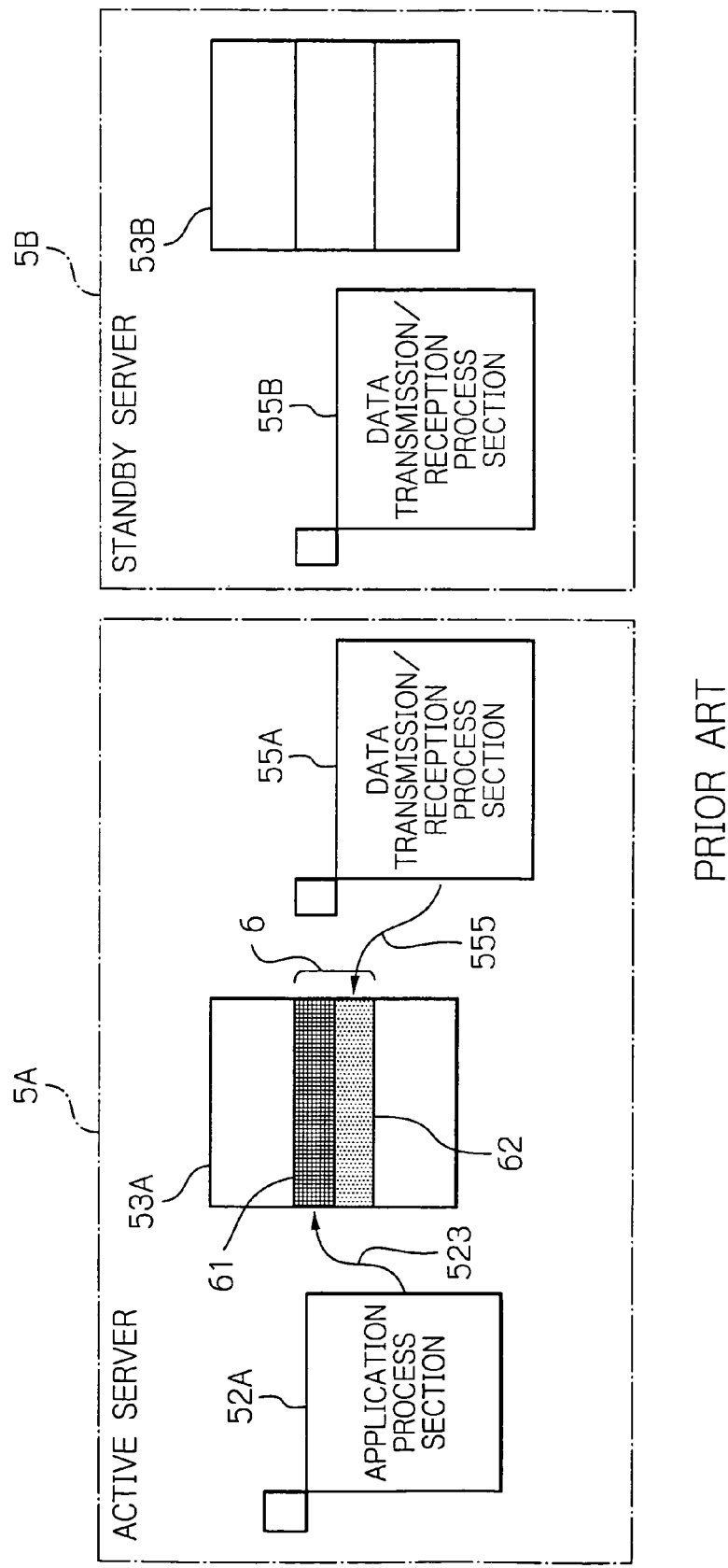
FIGS. 4 and 5 are schematic block diagrams for describing the problems occurred by the conventional data synchronization process.
Figure 5:
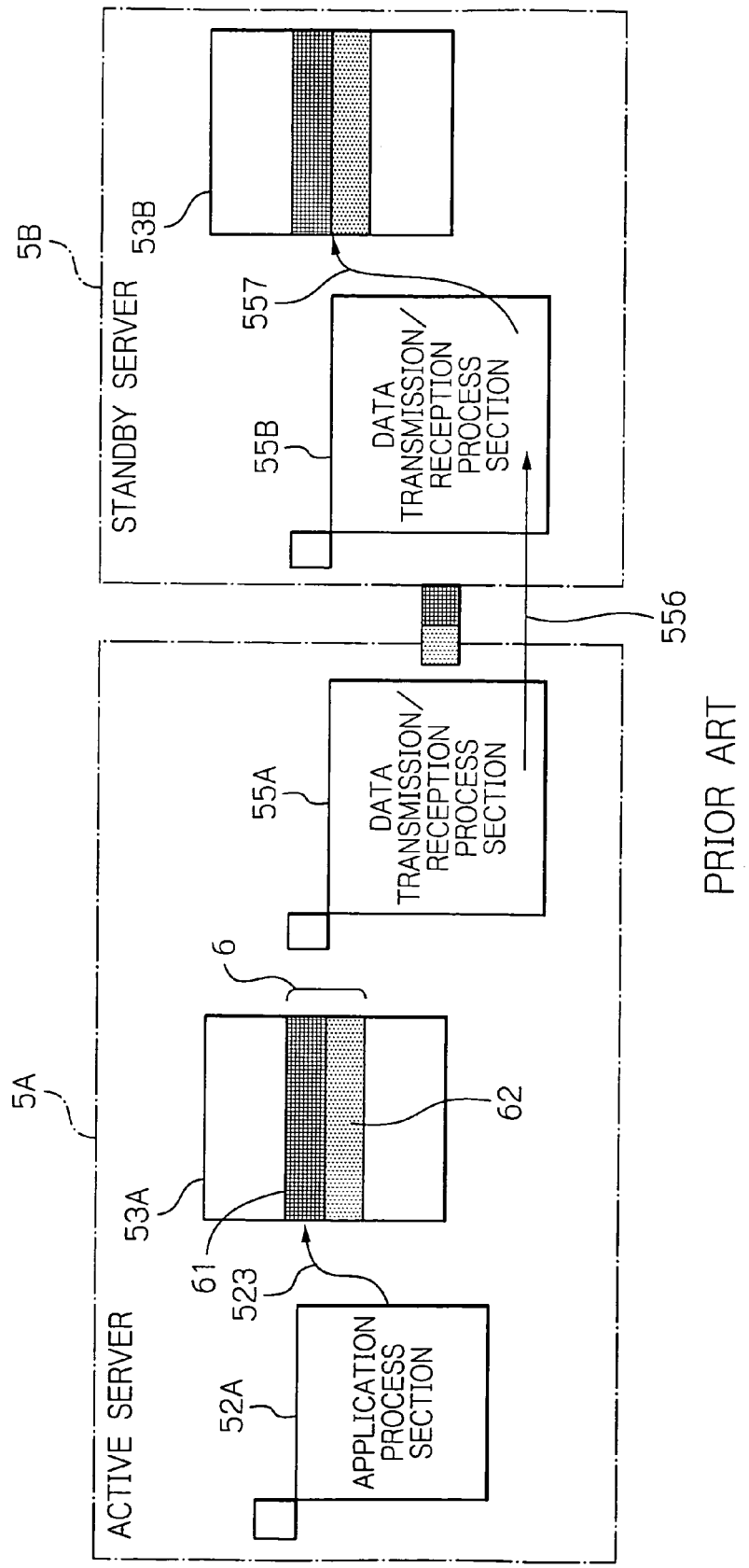

With reference to FIG. 1, the duplex system of the illustrative embodiment includes an active server 1A and a standby server 1B, which are the same in function and construction. According to circumstances, either one of the two servers may function as an active server, while the other functions as a standby server, both being exchangeable, of course.

The active server 1A and standby server 1B each have processing sections, such as an application process 11, indicated as 11A and 11B in the figures, a redundancy management process 12, indicated as 12A and 12B, and a data transmission/reception process 13, indicated as 13A and 13B.

The active server 1A and standby server 1B further have shared memory segment arrays 14, indicated as 14A and 14B in the figures, and temporary storage regions 15, indicated as 15A and 15B, respectively.

In the following description, when a description is given in common to both active and standby servers, the suffices A and B are omitted. For example, in such a case, a data transmission/reception process is represented simply with reference numeral 13. When a description is given specifically to either of the active and standby systems, an appropriate suffix A or B accompanies. For example, in the latter case, a data transmission/reception process is referred to with reference numeral 13A or 13B.

The shared memory segment array 14 is developed on the shared memory of the respective servers, and has memory segments on which data and instances are stored for executing the application process 11. The shared memory refers to a memory region that is shared by multiple processes.

The temporary storage region 15 is developed on the shared memory of the respective servers. The temporary storage region 15 has a write position index 21, a read position index 22, and a changed-data array 23.

The changed data is constituted by the same data 232 as written into the shared memory segment array 14 by the application process 11, and a data synchronous header 231 which has positional information in the shared memory segment array 14 representative of the position of written data on the array 14.

FIG. 6 shows plural items of information contained in the data synchronous header 231. As shown in the figure, the data synchronous header 231 contains a segment identifier 31 and a segment index 32.

The segment identifier 31 is used for uniquely identifying a segment in the shared memory segment array 14. Therefore, where there are a plurality of memory segments, the segment identifier 31 can be referred by the data transmission/reception process 13 to determine which of the memory segments in the shared memory segment array 14 has data to which the segment identifier 31 is directed.

The segment index 32 is used for indicating which of the segments from the head, or top, of the shared memory segment array 14 the data written last is stored in on the array 14.

The write position index 21 is used for indicating, when the active application process 11A writes data into the shared memory segment array 14A and then the active application process 11A writes changed data including the written data into the temporary storage region 15A, a write position on the region 15A of the changed data.

By the write position index 21, the active application process section 11A can know the position on the temporary storage region 15A where the changed data is written, and the active data transmission/reception process section 13A can know up to which position the data are written last from the head of the changed data array 23 of the temporary storage region 15A.

The write position index 21 is incremented in response to the application process 11A having written changed data into the temporary storage region 15A.

The read position index 22 is used for indicating a position from which the active data transmission/reception process 13A reads out changed data in the temporary storage region 15A. The index 22 enables the active data transmission/reception process section 13A to know up to which position the data are read out last from the head of the changed-data array 23.

The read position index 22 is incremented in response to the active data transmission/reception process 13A having read out changed data.

Note that the write position index 21 and read position index 22 are represented by, for example, 32 bits, and the atomicity of the indexes is ensured by data of 32 bits.

In the illustrative embodiment, the atomicity refers to the limitation of processable data. For instance, when a server is implemented with a CPU of 32 bits or more, the server ensures that data is written to and read from a 32-bit region by multi-processing or a multi-thread operation.

For instance, when a process A periodically writes a value of 0x100 into an int-type shared memory region X without restricting access to the shared memory region X, and a process B writes a value of 0x10 into the same region, it is ensured that, for example, into the shared memory region X, data such as a value of 0x110 is not written but either of the values of 0x100 and 0x10 is written.

The application process section 11 is to execute applications.

The redundancy management process section 12 mutually monitors the servers in terms of failures. For example, the redundancy management process sections 12 of both servers are connected by UDP (User Datagram Protocol) 121 so as to mutually monitor the servers in terms of failure. In addition, the redundancy management process 12 has the following functions.

First, the redundancy management process 12 a function to instruct, if detecting that it fails to communication with the redundancy management process section 12B of the standby server 11B, the data transmission/reception process section 13 and application process section 11 of its own server where that management process 12 is included to switch to its active state.

The redundancy management process 12 also functions to confirm the existence of the application process section 11 of its own server.

In addition, the redundancy management process 12A of the active server has a function to instruct, when the application process 11A fails, the data transmission/reception process section 13A of its own server to switch to its standby state and transmit a state switching request to the redundancy management process section 12B of the other server.

Moreover, the redundancy management process 12B of the standby server has a function to instruct, when the state switching request is received from the redundancy management process section 12A of the active server, the data transmission/reception process section 13B and application process section 11B of its own server to switch to its active state.

Furthermore, the redundancy management process 12 functions to forward, when its own server is asked for notification of the server state by the data transmission/reception process 13, information on whether it is in its active or standby state.

The data transmission/reception process 13 transmits and receives data so as to synchronize data between its own server and the other server. The data transmission/reception process section 13A of the active server has a function to check the temporary storage region 15A at regular intervals, in such a manner that, if data from the application process section 11A have been written in the region 15A, it transfers the data to the data transmission/reception process section 13B of the standby server. On the other hand, the data transmission/reception process section 13B of the standby server has a function of writing, when data is received from the data transmission/reception process section 13A of the active server, the data into the shared memory segment array 14B of the standby server.

Now, the data synchronization between the active server 1A and standby server 1B of the illustrative embodiment will be described with reference to the drawings.

First, the operation of the data transmission/reception process section 13A of the active server 1A will be described with reference to FIG. 7, which shows how the section 13A operates.

The data transmission/reception process 13 is started (step S101) and then the temporary storage region 15 is generated onto the shared memory (step S102). Note that in the case where the temporary storage region 15 has already been generated, the already-generated region can be employed.

Next, the data transmission/reception process 13 instructs the redundancy management process 12 to confirm whether its own server works as the active or standby server (step S103). If it is the active server, the operation of the section 13A advances to step S104. If it act as the standby server, the operation advances to a connector "A" of FIG. 8 and its own server functions as the standby server 1B.

In step S104, the data transmission/reception process 13, e.g. the process section 13A, confirms whether or not the redundancy management process 12, e.g. the process section 12A of its own server, gives an instruction to switch to the standby state. If the instruction is given, the operation advances to the connector "A" of FIG. 8, and if the instruction is not given, it advances to step S105.

In step S105, it is confirmed, e.g. by the section 13A, whether or not the section 13A connects with the data transmission/reception process section 13B of the standby server 1B by a TCP (Transmission Control Protocol) 131.

If the TCP connection 131 is established, the operation advances to step S106. In step S106, the data transmission/reception process 13, e.g. the process section 13A, reads all of the data in the shared memory segment array 14A of the active server 1A, and then, transmits the read data to the data transmission/reception process section 13B of the standby server 1B (step S107).

On the other hand, in step S105, if the TCP connection 131 is not established, in the active server 1A, the data transmission/reception process section. 13A need not read data from the temporary storage region 15A to synchronize the data, and therefore makes the read position for the region 15A equal to the write position for the region 15A so as to virtually render all the data read into the temporary storage region 15A (step S114).

After the execution of step S114, the data transmission/reception process section 13A waits only for a predetermined period of time (step S115) and then returns to step S104 to repeat the processing.

In step S108, by referring to the write position index. 21 and read position index 22 of the temporary storage region 15A, the data transmission/reception process section 13A confirms whether or not the temporary storage region 15A includes data that needs to be synchronized.

For instance, when write position index 21 is "3", and read position index 22 is "1", the application process section 11A has written data up to the third position of the changed-data array 23 from the head of the array 23. However, since the data transmission/reception process section 13A has read data up to only the first position from the head in the array 23, data, which need to be synchronized, remain at the second and third positions from the head in the array 23.

In step S108, when the temporary storage region 15A includes data needing to be synchronized, the data transmission/reception process section 13A reads the data from the temporary storage region 15A and transmits the data to the data transmission/reception process section 13B of the standby server 1B (step S109).

After transmitting data in step S109, the data transmission/reception process section 13A increases the value of the read position index 22 of the temporary storage region 15A by one. Note that when the value of the read position index 22 is greater than the data storage capacity, i.e. the maximum number of the segments, of the changed-data array 23, the read position index 22 is reset to zero.

In the illustrative embodiment, assume that the data transmission/reception process section 13A first refers to the write position index 21 all the time and thereafter refers to the contents of the changed-data array 23.

On the other hand, in step S108, when the value of the read position index 21 becomes equal to that of the write position index 22, the data transmission/reception process section 13A determines that all data in the temporary storage region 15A have been read out, and the operation advances to step S111.

In step S111, the data transmission/reception process section 13A confirms whether the TCP connection 131 with the data transmission/reception process section 13B of the standby server 1B remains established. When the TCP connection 131 has been disconnected, the operation advances to step S114 because it cannot perform data synchronization. On the other hand, when the TCP connection 131 remains established, the operation advances to step S112.

In step S112, the data transmission/reception process section 13A confirms whether or not the redundancy management process section 12A of its own server gives an instruction to switch the server state to the standby server 1B. When the instruction is given, the operation advances to the connector "A" of FIG. 8. On the other hand, when the instruction is not given, the data transmission/reception process 13A waits a predetermined period of time (step S113) and then the operation repeats processing.

Subsequently, the operation of the data transmission/reception process section 13B of the standby server 1B will be described with reference to FIG. 8.

Figure 7:
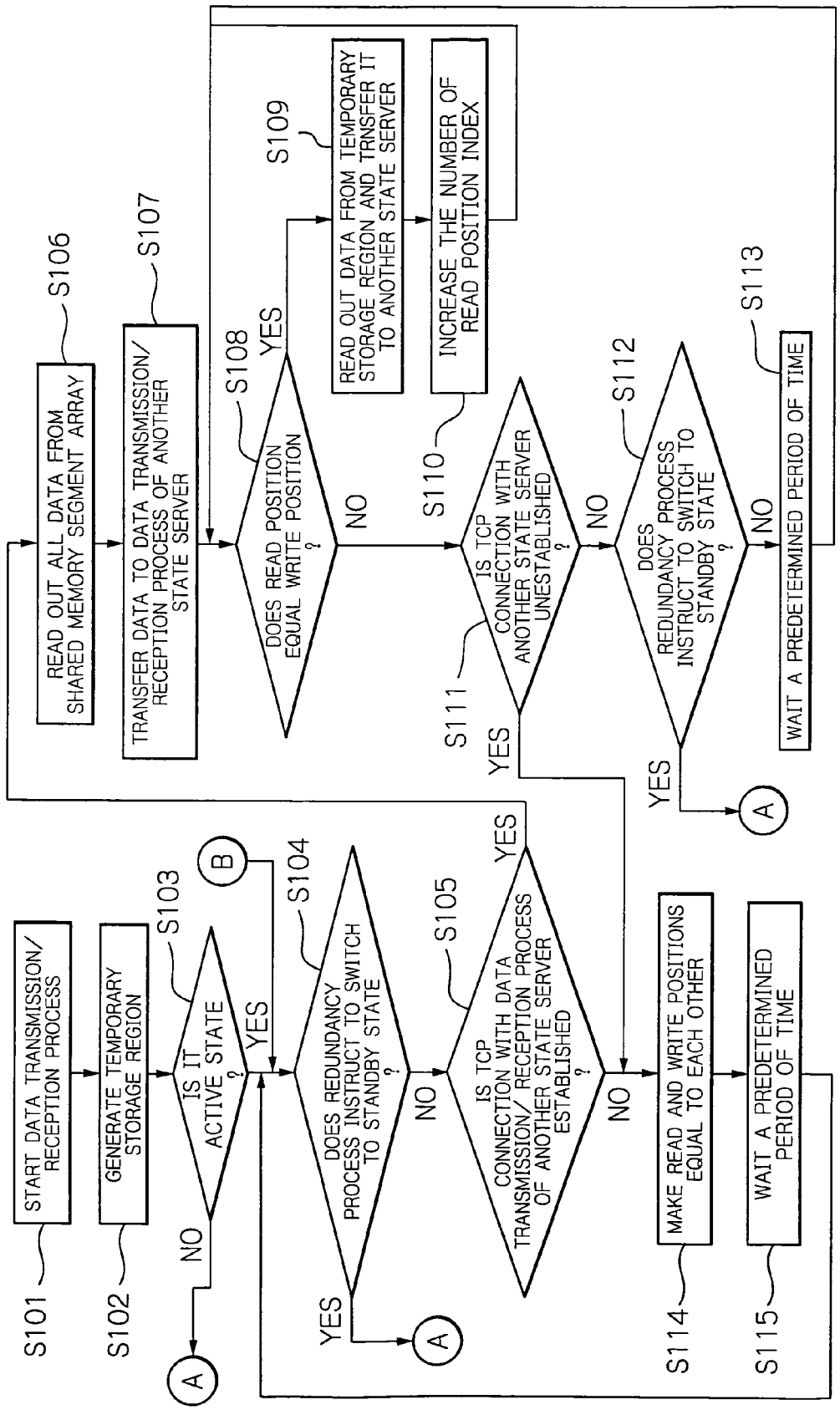
FIG. 7 is a flowchart showing how the data transmission/reception process is performed in the active server of the illustrative embodiment.
Figure 8:
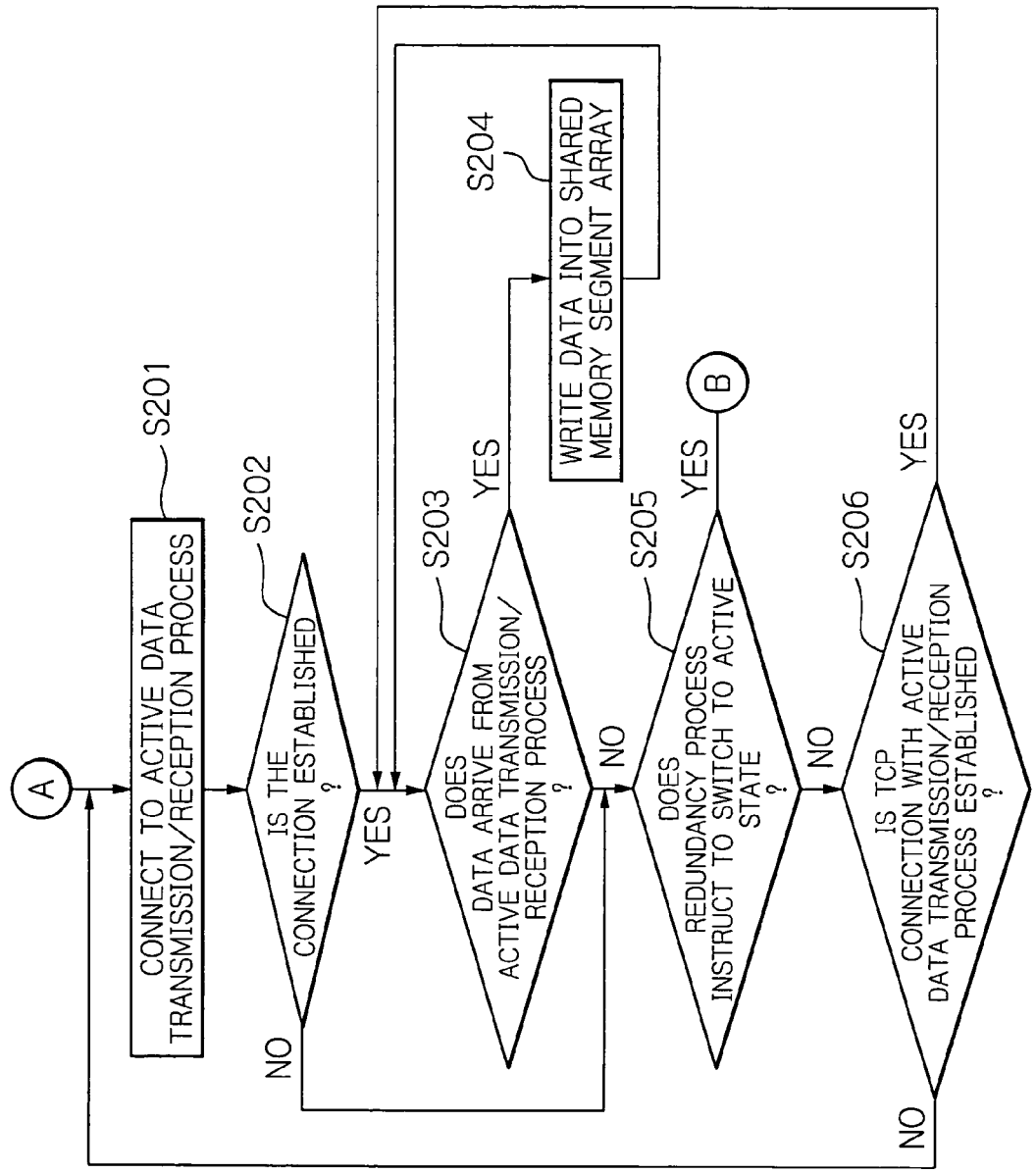
FIG. 8 is a flowchart showing how the data transmission/reception process is performed in the standby server of the illustrative embodiment.

FIG. 8 is a flowchart showing how the data transmission/reception process section 13B operates.

when the operation of the section 13B is in step S103 of FIG. 7, if the data transmission/reception process section 13A determines its own server to be the standby server, then the data transmission/reception process section 13B establishes a TCP connection 131 with the data transmission/reception process section 13A of the active server 1A (step S201).

In step S202, the data transmission/reception process section 13B confirms whether or not the TCP connection 131 with the data transmission/reception process section 13A has been established. If the TCP connection 131 is present, the operation advances to step 203. On the other hand, if no TCP connection 131 is present, the operation advances to step S205.

After the TCP connection 131 with the data transmission/reception process section 13A, when data have been transmitted from the section 13A (step S203), the data transmission/reception process section 13B writes the data into the shared memory segment array 14B (step S204) and then the operation returns back to step S203 to repeat processing.

On the other hand, when there is no data from the data transmission/reception process section 13A (step S203), the operation advances to step S205.

In step S205, the data transmission/reception process section 13B confirms whether or not the redundancy management process section 12B of its own server (standby server) gives an instruction to switch the server state to the active server.

If the instruction is given, the operation of the section 13B advances to step S104 of FIG. 7 so that the section 13B functions as the data transmission/reception process section 13A of the active server 1A.

On the other hand, if the instruction is not given, the data transmission/reception process section 13B confirms whether or not the TCP connection 131 with the data transmission/reception process section 13A has been established (step S206). If the TCP connection 131 has been established, the operation of the section 13B returns back to step S203 to repeat processing. If there is no TCP connection 131, the operation returns back to step S201 to repeat processing.

Subsequently, the operation of the application process of the active server will be described with reference to FIGS. 9, 10, 11 and 12.

Figure 9:
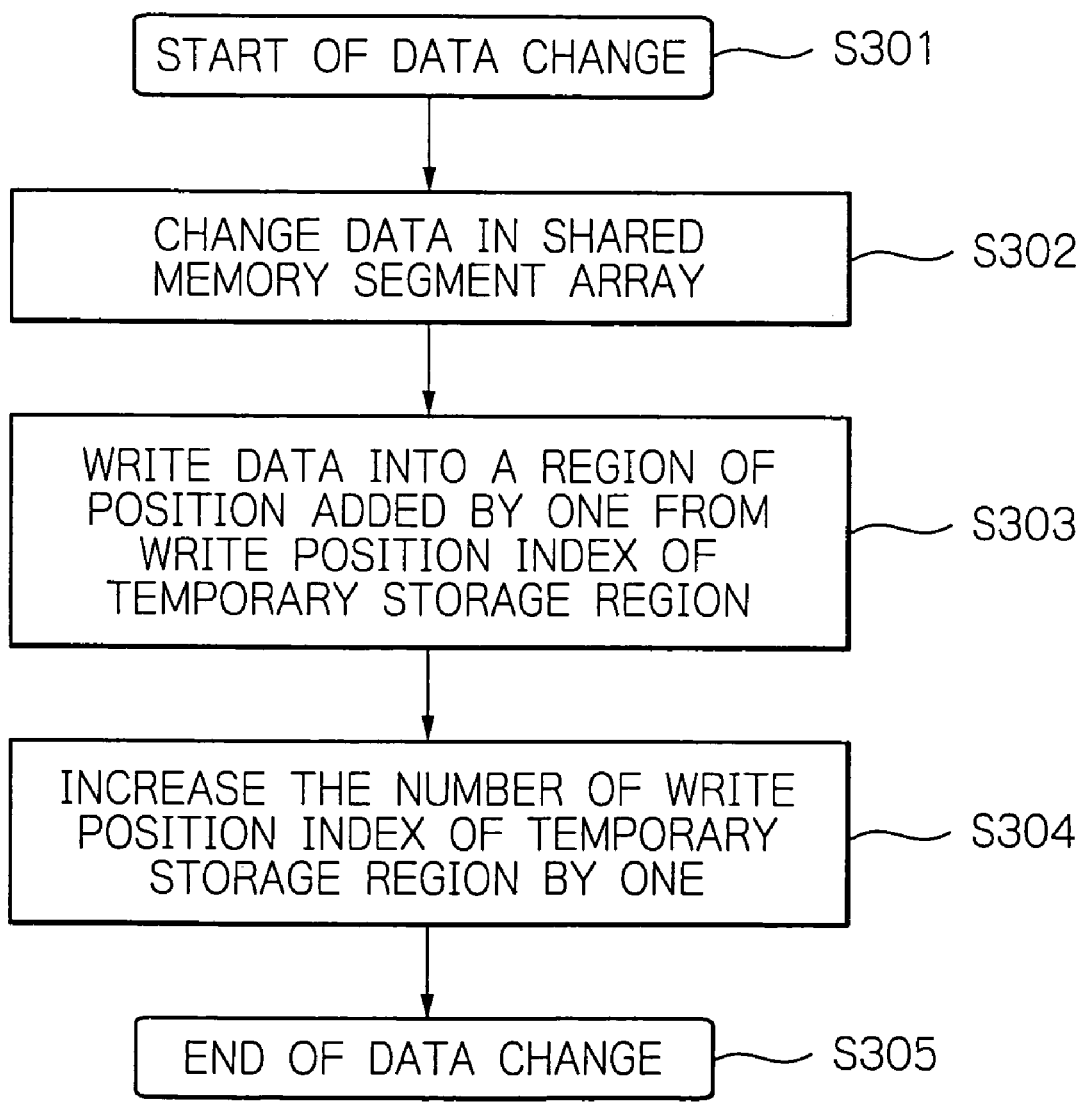
FIG. 9 is a flowchart showing how the application process changes data in the illustrative embodiment.

FIG. 9 is a flowchart showing how the application process section 11A of the active server 1A writes data into the shared memory segment array 14A.

In the active server 1A, if the writing of data by the application process section 11A is started (step S301), the section 11A first writes data into the shared memory segment array 14A (step S302).

If the application process section 11A writes data into the shared memory segment array 14A, then the section 11A writes the changed data into a region indicated by the write position index 21 of the temporary storage region 15A (step S303).

If the writing of the changed data into the temporary storage region 15A is completed, the application process section 11A increases the value of the write position index 21 by one (step S304).

Thus, the application process section 11A after writing data into the shared memory segment array 14A completes the writing of changed data into the temporary storage region 15A, and then the value of the write position index 21 is increased. Therefore, until the changed data are all written, the data transmission/reception process section 13A can be prevented from reading the changed data being written.

As a result, the reading of changed data being written by the application process section 11A can be avoided without restricting processing such as the writing of data by the section 11A.

Note that when the position of the subdivision of the temporary storage region 15A reaches its upper limit, the application process section 11A resets the value of the write position index 21 to zero which represents the head, or top, subdivision (step S304). Consequently, in writing the next data, the section 11A will write the data into a subdivision whose write position index 21 is zero (step S303). That is to say, when the position of a subdivision in the temporary storage region 15A reaches its upper limit, the next changed data is stored on the head subdivision of the region 15A, whereby the subdivisions in the region 15A can be employed over and over again.

Figure 10:
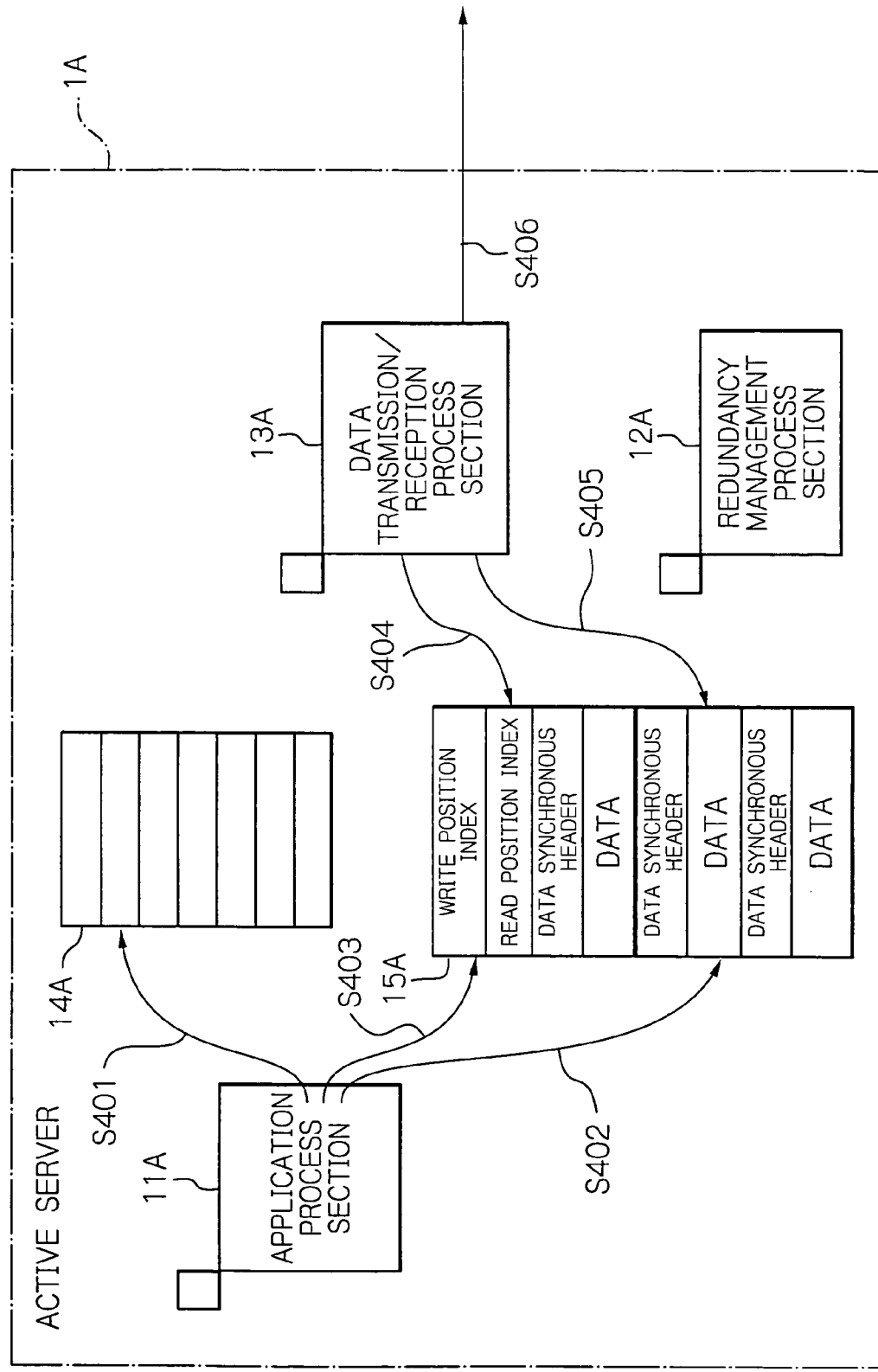
FIG. 10 is a schematic block diagram showing how the active server of the illustrative embodiment operates from the writing of data by the application process to the reading of data by the data transmission/reception process.

Referring to FIG. 10, there is shown how the active server 1A carries out from the writing of data to reading of data in accordance with the illustrative embodiment of the present invention.

If the application process section 11A writes data into the shared memory segment array 14A (step S401), after writing data into the array 14A, the section 11A also writes changed data contents into the temporary storage region 15A (step S402).

After writing the changed data contents into the temporary storage region 15A, the application process section 11A increases the value of the write position index 21 by one (step S403).

Thereafter, the data transmission/reception process section 13A reads out the write position index 21 and read position index 22 (step S404). Then, the data transmission/reception process section 13A compares the value of the write position index 21 with that of the read position index 22, and then, determines on the basis of the resultant comparison whether or not there is changed data that can be read out. The section 13A also reads out the changed data from the temporary storage region 15A on the basis of the value of read position index 22 (step S405), and transfers the data to the data transmission/reception process section 13B of the standby server 1B (step S406).

Figure 11:
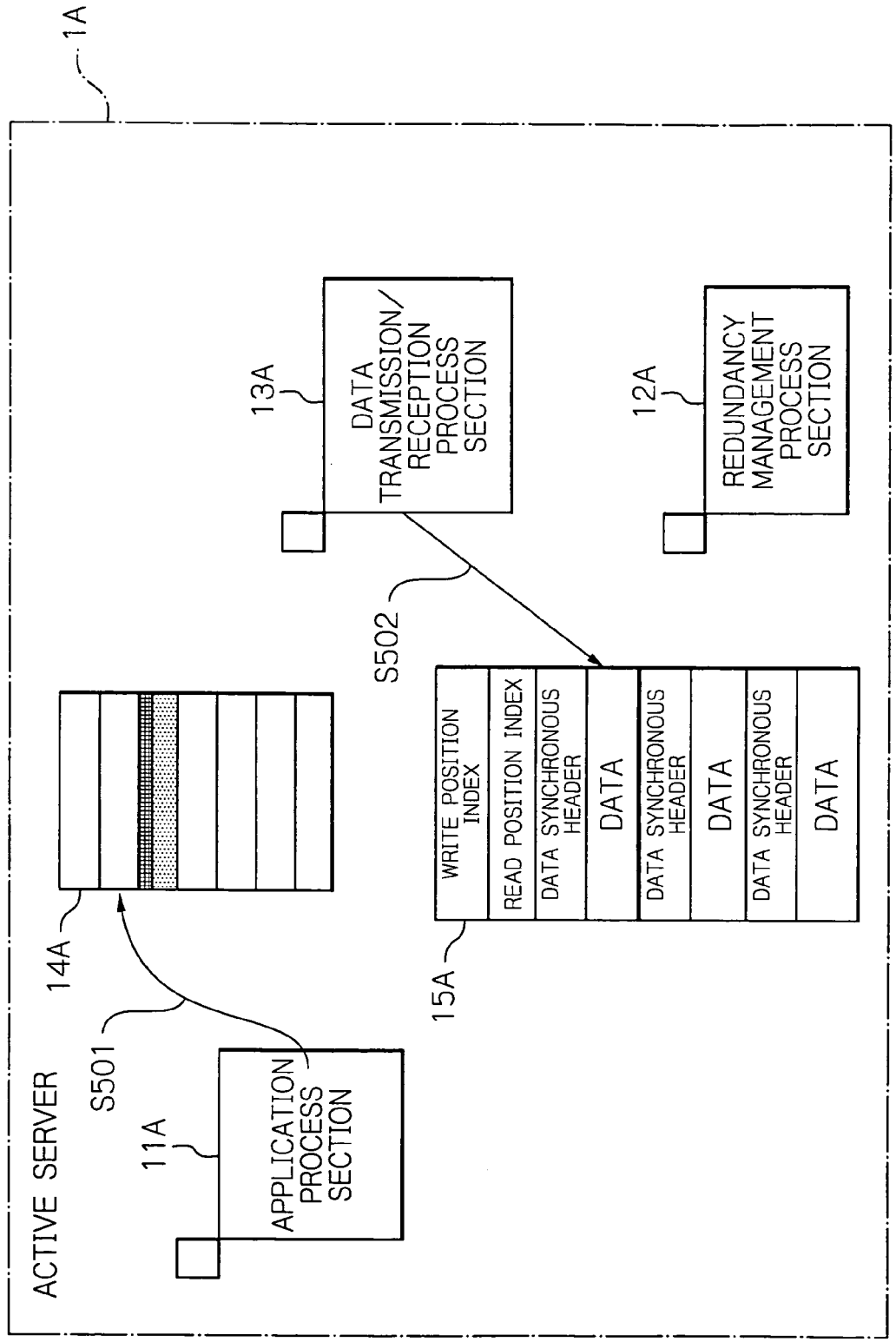
FIG. 11 is a schematic block diagram showing the case where the writing of data by the application process and the reading of data by the data transmission/reception process in the active server of the illustrative embodiment occur simultaneously.

Referring to FIG. 11, there is shown the case where the writing of data into the shared memory segment array 14A by the application process section 11A and reading of data by the data transmission/reception process section 13A occur simultaneously.

In that case, the application process section 11A, when writing data into the shared memory segment array 14A (step S501), does not have access to the temporary storage region 15A.

Therefore, because no changed data is input to the temporary storage region 15A, when application process is changing data into the shared memory segment array 14A, even if the data transmission/reception process section 13A refers to the temporary storage region 15A, there is no possibility that data being changed halfway will be synchronized (S502).

Referring to FIG. 12, when the application process section 11A is writing changed data into the temporary storage region 15A, there is shown how the data transmission/reception process section 13A performs the reading of the data being changed halfway.

In the illustrative embodiment, the value of the write position index 21 is updated after the application process section 11A writes changed data into the temporary storage region 15A.

In an example as shown in FIG. 12, when the application process section 11A changes data into the shared memory segment array 14A (S600), the section 11A is writing changed data at the position 23 of write position index "2", but the write position index 21 represents the value "1" (step S601).

The data transmission/reception process section 13A compares the write position index 21 and read position index 22, and then, reads changed data on the basis of the resultant comparison. Therefore, in the case as shown in FIG. 12, until the write position index 21 is updated after the writing of changed data is completed, the data transmission/reception process section 13A by no means reads data being changed halfway (step S602). That is to say, when the data transmission/reception process section 13A refers to the temporary storage region 15A while the section 13A is writing data into the shared memory segment array 14A, because the write position index has not been increased yet, i.e. it does not indicate region being written by the application process section 11A, there is no possibility that data changed halfway will be read in by the section 13A.

In summary, in the data synchronous system of the illustrative embodiment equipped with the write position index 21 and read position index 22, the application process 11 stores data in the temporary storage region 15 and then increases the value of the write position index 21 by one. In addition, the data transmission/reception process 13 confirms a position of written data in the temporary storage region 15 by referring to the value of the write position index 21 to read the data from the region 15. Thus, the data synchronous system is capable of performing data synchronization which ensures that data being changed halfway is not synchronized, i.e. consistent data synchronization without restricting processing.

While the illustrative embodiment includes a single shared memory segment array, in an alternative embodiment of the present invention, data synchronous system can be applied to any larger number of shared memory segment arrays.

In addition, while the illustrative embodiment includes a single application process, in a further embodiment of the present invention, the data synchronous system may be equipped with two or more application processes if two or more temporary storage regions are prepared.

The flowcharts are shown in FIGS. 7, 8, and 9 for the purpose of illustrating the preferred embodiment of the present invention solely and not for the purpose of limiting the invention to the same. It is to be understood that the data synchronous system of the present invention can be applied to other various ways of control flow. The other ways of control flow are advantageous at least insofar as three following procedures are included. In the first procedure, a write position index is prepared in which atomic write and read operations are ensured. In the second procedure, an application process on the date writing side stores data on a temporary storage region and then increases the number of the write position index. In the third procedure, a data transmission/reception process on the data reading side confirms the position of written data in the temporary storage region by using the write position index and then reads out the data from the temporary storage region.

The data synchronous system of the present invention is not to be limited to the specific sizes of the changed-data array of the temporary storage region and the shared memory segment array of the illustrative embodiment, but may be applied to various sizes.

The write and read position indices, in writing and reading changed data into and from the temporary storage region, are used to distinguish up to which position the changed data have been written in, and up to which position the changed data have been read out. For that reason, although the illustrative embodiment employs an index number that distinguishes the position of a subdivision on the temporary storage region, the data synchronous system of the present invention is not to be limited to this specific embodiment, but may use, for example, the capacity of a vacant region of the temporary storage region.

In the illustrative embodiment, when the position of a subdivision of the temporary storage region reaches its upper limit, the next changed data is stored in the top subdivision. At this time, assume that the data stored in the top subdivision is not cleared but updated with the next data.

In addition, the data read out from the temporary storage region by the data transmission/reception process may be deleted from the temporary storage region.

Although the functions of the data synchronous system of the present invention described in terms of the illustrative embodiment are implemented by software, they maybe implemented by hardware or programmed devices, if possible.

The entire disclosure of Japanese patent application Ser. No. 2007-247855 filed on Sep. 25, 2007, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A data synchronous system for synchronizing, between a plurality of servers each having a shared memory, data which are stored on the respective shared memories,
wherein each server comprises:
an application executer for executing an application on its own server;
a first storage section for storing first data required for execution of the application and second data that is changed according to the execution of the application in a first storage region of the shared memory in its own server;
a second storage section for storing said second data and second write positional information, which represents a position in the first storage region of said second data, in a second storage region of the shared memory in its own server, and further, after said second data and said second write position information are stored, for storing a write position index, which represents a write position in the second storage region of said second data, in said second storage region, and storing a read position index, which represents a read position in the second storage region of said second data, in said second storage region; and
a data communicator for transferring said first data to another server, and further, for checking said second data on the basis of said write position index and said read position index to confirm whether or not there is a third data, which is not yet transferred to the other server but is written onto said first storage region, and then, for transferring said third data and third write positional information, which represents a position on the second storage region of said third data, to the other server; and
wherein, when said data synchronous system uses, among said plurality of servers, a first server as an active server and a second server as a standby server,
if said first server can communicate with said second server by means of a first communication protocol connecting networks with each other,
in said first server,
said data communicator transfers said first and second data to said second server,
said first storage section stores said second data according to the execution of the application, said second storage section stores said second data and said second write positional information, and then stores said write position index of said second data, said data communicator transfers said third data and said third write positional information to said second server, and said second storage section updates said read position index in response to the transfer of said third data by said data communicator, and if said first server cannot communicate with said second server by means of said first communication protocol, in said first server,
said second storage section stores an index equal to said write position index as said read position index.

2. The system in accordance with claim 1, wherein said second storage region includes a region ensuring a single write or read operation executed by said application.

3. A method of synchronizing, between a plurality of servers each having a shared memory, data which are stored in the respective shared memories, wherein each server includes:
an application executer for executing an application on its own server;
a first storage section for storing first data required for execution of the application and second data that is changed according to the execution of the application in a first storage region of the shared memory in its own server;
a second storage section for storing said second data and second write positional information, which represents a position in the first storage region of said second data, in a second storage region of the shared memory in its own server, and further, after said second data and said second write position information are stored, for storing a write position index, which represents a write position in the second storage region of said second data, in said second storage region, and storing a read position index, which represents a read position in the second storage region of said second data, in said second storage region; and
a data communicator for transferring said first data to another server, and further, for checking said second data on the basis of said write position index and said read position index to confirm whether or not there is a third data, which is not yet transferred to the other server but is written onto said first storage region, and then, for transferring said third data and third write positional information, which represents a position on the second storage region of said third data, to the other server;
said method comprising:
when said data synchronous system uses, among said plurality of servers, a first server as an active server and a second server as a standby server,
if said first server can communicate with said second server by means of a first communication protocol connecting networks with each other,
in said first server,
a first data transmission step of causing the data communicator to transfer said first and second data to said second server;
a first storage step of causing the first storage section to store said second data according to the execution of the application;
a second storage step of causing the second storage section to store said second data and said second write positional information, and then to store said write position index of said second data;

a second data transmission step of causing the data communicator to transfer said third data and said third write positional information to said second server; and a third storage step of causing the second storage section to update said read position index in response to the transfer of said third data by said data communicator, and if said first server cannot communicate with said second server by means of said first communication protocol, in said first server, a fourth storage step of causing the second storage section to store an index equal to said write position index as said read position index.

4. A non-transitory computer-readable storage medium that stores a data synchronization program for synchronizing, between a plurality of servers each having a shared memory, data which are stored in the respective shared memories, wherein each of the plurality of servers is caused to function as:

an application executer for executing an application on its own server;

a first storage section for storing first data required for execution of the application and second data that is changed according to the execution of the application in a first storage region of the shared memory in its own server;

a second storage section for storing said second data and second write positional information, which represents a position in the first storage region of said second data, in a second storage region of the shared memory in its own server, and further, after said second data and said second write position information are stored, for storing a write position index, which represents a write position in the second storage region of said second data, in said second storage region, and storing a read position index, which represents a read position in the second storage region of said second data, in said second storage region; and a data communicator for transferring said first data to another server, and further, for checking said second data on the basis of said write position index and said read position index to confirm whether or not there is a third data, which is not yet transferred to the other server but is written onto said first storage region, and then, for transferring said third data and third write positional information, which represents a position on the second storage region of said third data, to the other server; and wherein, when said data synchronous system uses, among said plurality of servers, a first server as an active server and a second server as a standby server, if said first server can communicate with said second server by means of a first communication protocol connecting networks with each other, in said first server, said data communicator transfers said first and second data to said second server, said first storage section stores said second data according to the execution of the application, said second storage section stores said second data and said second write positional information, and then stores said write position index of said second data, said data communicator transfers said third data and said third write positional information to said second server, and said second storage section updates said read position index in response to the transfer of said third data by said data communicator, and if said first server cannot communicate with said second server by means of said first communication protocol, in said first server, said second storage section stores an index equal to said write position index as said read position index.

5. A server having a shared memory and forming a data synchronous system together with another server having another shared memory for synchronizing data stored on the shared memories with the other server, comprising:

an application executer for executing an application;

first storage section for storing first data required for execution of the application and second data that is changed according to the execution of the application in a first storage region of the shared memory;

a second storage section for storing said second data and second write positional information, which represents a position in the first storage region of said second data, in a second storage region of the shared memory, and further, after said second data and said second write position information are stored, for storing a write position index, which represents a write position in the second storage region of said second data, in said second storage region, and storing a read position index, which represents a read position in the second storage region of said second data, in said second storage region; and a data communicator for transferring said first data to the other server, and further, for checking said second data on the basis of said write position index and said read position index to confirm whether or not there is a third data, which is not yet transferred to the other server but is written onto said first storage region, and then, for transferring said third data and third write positional information, which represents a position on the second storage region of said third data, to the other server; and wherein, when said server acts as an active server and the other server acts as a standby server, if said server can communicate with the other server by means of a first communication protocol connecting networks with each other, said data communicator transfers said first and second data to the other server, said first storage section stores said second data according to the execution of the application, said second storage section stores said second data and said second write positional information, and then stores said write position index of said second data, said data communicator transfers said third data and said third write positional information to the other server, and said second storage section updates said read position index in response to the transfer of said third data by said data communicator, and if said server cannot communicate with the other server by means of said first communication protocol, said second storage section stores an index equal to said write position index as said read position index.

6. The system in accordance with claim 1, wherein said first storage region is a segment array.

7. The system in accordance with claim 1, wherein said second storage region is a temporary storage.

8. The system in accordance with claim 1, wherein said first communication protocol is a TCP (Transmission Control Protocol).

9. The method in accordance with claim 2, wherein said first communication protocol is a TCP (Transmission Control Protocol).

* * * * *